United States Patent
Zhu et al.

(10) Patent No.: US 11,307,018 B2
(45) Date of Patent: Apr. 19, 2022

(54) TWO-DEGREE-OF-FREEDOM HETERODYNE GRATING INTERFEROMETRY MEASUREMENT SYSTEM

(71) Applicants: TSINGHUA UNIVERSITY, Beijing (CN); BEIJING U-PRECISION TECH CO., LTD., Beijing (CN)

(72) Inventors: Yu Zhu, Beijing (CN); Ming Zhang, Beijing (CN); Leijie Wang, Beijing (CN); Fuzhong Yang, Beijing (CN); Rong Cheng, Beijing (CN); Xin Li, Beijing (CN); Weinan Ye, Beijing (CN); Jinchun Hu, Beijing (CN)

(73) Assignees: TSINGHUA UNIVERSITY, Beijing (CN); BEIJING U-PRECISION TECH CO., LTD., Beijing (CN)

( * ) Notice: Subject to any disclaimer, the term of this patent is extended or adjusted under 35 U.S.C. 154(b) by 0 days.

(21) Appl. No.: 17/257,219

(22) PCT Filed: Jun. 26, 2019

(86) PCT No.: PCT/CN2019/092922
§ 371 (c)(1),
(2) Date: Dec. 30, 2020

(87) PCT Pub. No.: WO2020/007218
PCT Pub. Date: Jan. 9, 2020

(65) Prior Publication Data
US 2021/0164772 A1 Jun. 3, 2021

(30) Foreign Application Priority Data
Jul. 2, 2018 (CN) .......................... 201810709970.7

(51) Int. Cl.
*G01B 9/02003* (2022.01)
*G01B 9/02015* (2022.01)
(Continued)

(52) U.S. Cl.
CPC ..... *G01B 9/02003* (2013.01); *G01B 9/02027* (2013.01); *G01B 9/02051* (2013.01);
(Continued)

(58) Field of Classification Search
CPC ............ G01B 9/02003; G01B 9/02007; G01B 9/02027; G01B 9/02051; G01B 2290/70
See application file for complete search history.

(56) References Cited

U.S. PATENT DOCUMENTS

| 5,225,887 A | * | 7/1993 | Lipson .................. G01D 5/266 250/227.19 |
| 6,020,964 A | | 2/2000 | Loopstra et al. |

(Continued)

FOREIGN PATENT DOCUMENTS

| CN | 103604375 A | 2/2014 |
| CN | 103759654 A | 4/2014 |

(Continued)

OTHER PUBLICATIONS

English translation of CN 108106536A. Translation obtained from Espacenet on Sep. 27, 2021. (Year: 2021).*

*Primary Examiner* — Michael A Lyons
(74) *Attorney, Agent, or Firm* — Holzer Patel Drennan

(57) ABSTRACT

A two-degree-of-freedom heterodyne grating interferometry measurement system, comprising: a single-frequency laser device for emitting a single-frequency laser, and the single-frequency laser can be split into a beam of reference light and a beam of measurement light; an interferometer mirror group and a measurement grating for forming a reference interference signal and a measurement interference signal (Continued)

from the reference light and the measurement light; and a receiving optical fiber for receiving the reference interference signal and the measurement interference signal, wherein a core diameter of the receiving optical fiber is smaller than a width of an interference fringe of the reference interference signal and the measurement interference signal, so that the receiving optical fiber receives a part of the reference interference signal and the measurement interference signal. The measurement system has advantages of insensitivity to grating rotation angle error, small volume, light weight, and a facilitating arrangement.

10 Claims, 3 Drawing Sheets

(51) Int. Cl.
  *G01B 11/06* (2006.01)
  *G01B 9/02* (2022.01)
(52) U.S. Cl.
  CPC ...... *G01B 11/0641* (2013.01); *G01B 11/0675* (2013.01); *G01B 2290/70* (2013.01)

(56) References Cited

U.S. PATENT DOCUMENTS

| | | | |
|---|---|---|---|
| 6,897,961 | B2 | 5/2005 | Muenter et al. |
| 2013/0114087 | A1 | 5/2013 | Deck |
| 2015/0268031 | A1* | 9/2015 | Zhu .................... G01B 9/02049 356/486 |
| 2016/0138903 | A1* | 5/2016 | Zhang ................ G01B 9/02007 356/488 |
| 2016/0153764 | A1* | 6/2016 | Zhu .................... G01B 9/02021 356/488 |

FOREIGN PATENT DOCUMENTS

| | | |
|---|---|---|
| CN | 103759656 A | 4/2014 |
| CN | 104567696 A | 4/2015 |
| CN | 104596424 A | 5/2015 |
| CN | 106017308 A | 10/2016 |
| CN | 106091940 A | 11/2016 |
| CN | 108106536 A | 6/2018 |
| CN | 207487599 U | 6/2018 |
| CN | 108627099 A | 10/2018 |
| CN | 108627100 A | 10/2018 |

* cited by examiner

TWO-DEGREE-OF-FREEDOM HETERODYNE GRATING INTERFEROMETRY MEASUREMENT SYSTEM

TECHNICAL FIELD

The present invention relates to the technical field of interferometry measurement, and more specifically, relates to a two-degree-of-freedom heterodyne grating interferometry measurement system.

BACKGROUND ART

As a typical displacement sensor, an interferometry measurement system has advantages of traceability to length, high measurement accuracy, large measurement range, large dynamic measurement range, convenience installation and debugging, etc., therefore it is widely used in the field of precision and ultra-precision measurement, commonly found in precision machinery and processing equipment. At present, the interferometry measurement system can be mainly divided into laser interferometry measurement system and grating interferometry measurement system, the laser interferometry measurement system is based on the measurement principle of laser interference, while the grating interferometry measurement system is based on the principle of diffraction interference and adopts a grating pitch as measurement reference, thus the grating interferometry measurement system is relatively less sensitive to environmental fluctuations and has higher repeatability measurement accuracy.

Due to reasons such as vibration during installation and movement, rotation angle error of the grating inevitably is occurred, as a result, there is an angle between the beam of measurement light and the beam of reference light, thereby a coaxial interference cannot be realized. Therefore, no ideal interference spot is received by the detector, but an interference fringe with a certain fringe period is received by the detector, which causes the intensity of an AC signal, that is, the AC/DC ratio of an interference measurement signal, to rapidly decrease. Good AC signal strength is the basis for realizing the displacement measurement. Rotation angle error of the grating may cause the signal strength to decrease, and when there is a large rotation angle error of the grating, the system cannot realize the measurement of the displacement.

To solve the above problems, existing solutions are mainly to introduce a pyramid prism into an optical path so as to eliminate the angle of the beams, in this way, the beam of reference light and the beam of measurement light may not form an interference fringe at the detector. As disclosed in Zygo company's US patent US20110255096A1 (published on Oct. 20, 2011), however, since the measurement optical path and the reference optical path do not overlap, there is still parallel deviation of the light beams, and when the grating has a small rotation angle, the decrease of AC/DC ratio of the AC signal is small, which reduces the influence of the grating rotation angle on the quality of the measurement signal, but the influence cannot be eliminated fundamentally, in addition, the introduction of the pyramid prism results in more complex optical path, thereby generally forms a secondary diffraction optical path and its energy loss is large.

Accordingly, it is necessary to provide a grating interferometry measurement system that can effectively solve the problem of measurement signal strength reduction caused by installation and movement deviation of the measurement grating, that can reduce requirements for an installation accuracy of the grating and a rotation angle deviation during the movement, that is particularly suitable for a scenario with a higher requirement for an installation error in industrial application, that has characteristics of simple and compact optical structure, convenience installation and operation, good stability and economy, etc.

SUMMARY OF THE INVENTION

In order to solve the problems existing in the prior art and meet the development needs of the technical field, the present invention provides a two-degree-of-freedom grating interferometry measurement system with a large rotation angle tolerance. The grating interferometry measurement system of the present invention is particularly suitable for a scenario with a higher requirement for an installation error in industrial application, and also can be applied to scenarios of precision measurement for displacement of a workpiece table such as a precision machine tool, a three-coordinate measurement machine, and a semiconductor detection equipment.

The present invention adopts the following technical solution.

A two-degree-of-freedom grating interferometry measurement system, comprising: a single-frequency laser device 1 for emitting a single-frequency laser, and the single-frequency laser can be split into a beam of reference light and a beam of measurement light; an interferometer mirror group 3 and a measurement grating 4 for forming a reference interference signal and a measurement interference signal from the reference light and the measurement light; and a receiving optical fiber for receiving the reference interference signal and the measurement interference signal, wherein a core diameter of the receiving optical fiber is smaller than a width of an interference fringe of the reference interference signal and the measurement interference signal, so that the receiving optical fiber receives a part of the reference interference signal and the measurement interference signal.

Furthermore, the receiving optical fiber is a multimode optical fiber 5, the reference interference signal comprises one path of reference interference signal, and the measurement interference signal comprises two paths of measurement interference signals, and the two measurement interference signals and the one reference interference signal are respectively coupled and received by the multimode optical fiber 5 to output three optical signals.

Furthermore, the measurement grating 4 can perform linear motion with two degrees of freedom in horizontal direction and vertical direction with respect to the interferometer mirror group 3.

Furthermore, the interferometer mirror group 3, from one side to the other side, comprises a reflecting mirror 35, a refractive element 33, a quarter wave plate 34, a beam splitting prism 31, and a polarization splitting prism 32 in sequence, wherein the beam splitting prism 31 is positioned on the polarization splitting prism 32.

Furthermore, the reference light is split into three beams of light after passing through the beam splitting prism 31, and is used as the reference light of three interference signals after being reflected by the polarization splitting prism 32.

The measurement light is split into three beams of light after passing through the beam splitting prism 31, and two beams of the measurement light are reflected by the polarization splitting prism 32, then pass through the quarter wave plate 34 and the refractive element 33 in sequence, and after that are incident to the measurement grating 4 to be diffracted by the grating, then return back, and are transmitted by passing through the polarization splitting prism 32 again, then interfere with two reference light among the reference light of the three interference signals, to form two measurement interference signals.

Another beam of measurement light is reflected by the polarization splitting prism 32, then passes through the quarter wave plate 34, after that is reflected by the reflecting mirror 35 to return back along original optical path and is transmitted by passing through the quarter wave plate 34 and the polarization splitting prism 32 again, then interferes with another reference light among the reference light of the three interference signals, to form one reference interference signal.

Furthermore, components in the interferometer mirror group 3 are adjacent and fixed to each other and are integrated into an integrated structure.

Furthermore, a cross section of the refractive element 33 is an isosceles trapezoid, and the measurement light is refracted when transmitted through both sides of the trapezoid and reflected when transmitted through top of the trapezoid.

Furthermore, the two beams of the measurement light pass through the refractive element 33, then are incident to the measurement grating 4 by an incident light path of a specific angle, wherein the specific angle causes a diffracted light path to overlap with the incident light path; the diffracted light path passes through the refractive element 33 to interferes with and in parallel with two reference light among the reference light of three interference signals, to form two measurement interference signals.

Furthermore, the interferometry measurement system further includes an acousto-optic modulator 2 for performing frequency shifting of the split single-frequency laser.

Furthermore, the interferometry measurement system further includes a photoelectric conversion unit 6 and an electronic signal processing component 7, wherein the photoelectric conversion unit 6 is utilized to receive the optical signal transmitted by the multimode optical fiber 5 and convert the optical signal into an electrical signal, and input the electrical signal to the electronic signal processing component 7; the electronic signal processing component 7 receives the electrical signal to calculate a linear displacement of the measurement grating 4.

Compared with the prior art, the two-degree-of-freedom heterodyne grating interferometry measurement system provided by the present invention has the following advantages:

(1) Compared to the conventional two-degree-of-freedom interferometry measurement system, the measurement system of the present invention can effectively avoid the influence on the measurement signal strength due to the installation error of the rotation angle between the interferometer and the measurement grating and the rotation angle deviation generated during the movement.

(2) The measurement system of the present invention has small volume and high integration, and effectively improves the space utilization and the integration of the whole application system.

(3) The measurement system can realize simultaneous measurement of two degrees of freedom including two translational displacements, has low environmental sensitivity, the measurement signal is easy to be processed, and the resolution and accuracy can be of nanometer level or even higher.

BRIEF DESCRIPTION OF THE DRAWINGS

The above and other objects and results of the present invention will become more apparent and easier to be understood with reference to the contents of the following embodiments and claims in combination with the accompanying drawings, and in the drawings.

REFERENCE NUMERALS

Figure 1:
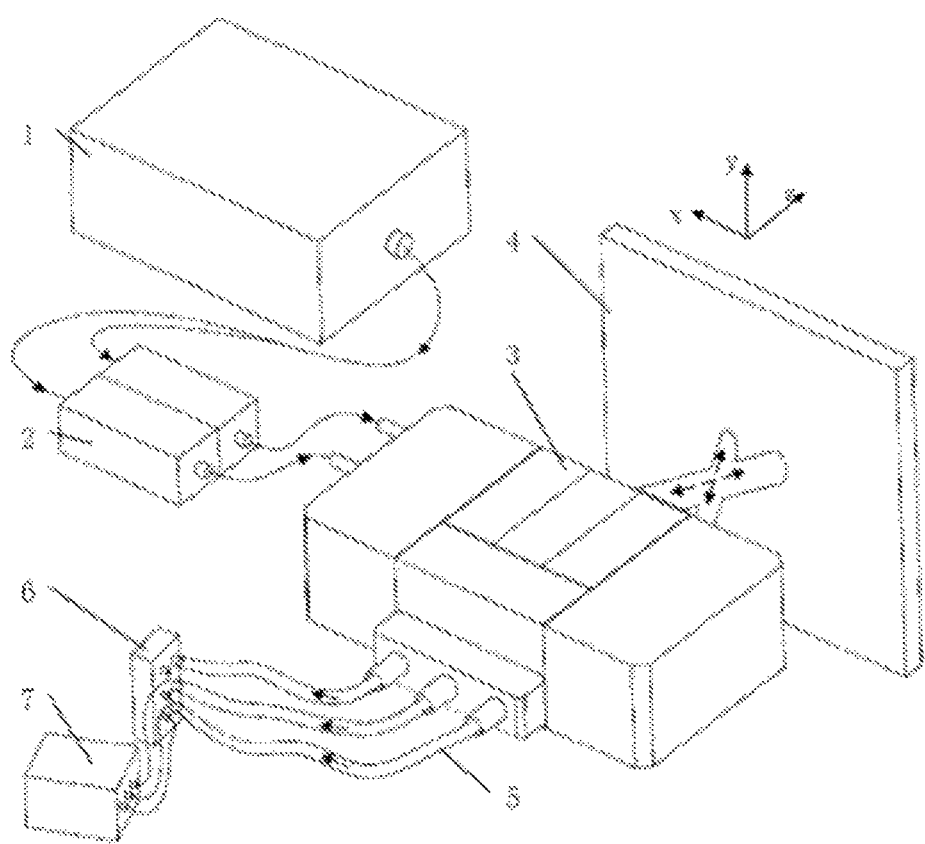
FIG. 1 is a schematic diagram of the two-degree-of-freedom heterodyne grating interferometry measurement system according to the present invention.

1: single-frequency laser device;
2: acousto-optic modulator;
3: interferometer mirror group;
4: measurement grating;
5: multimode optical fiber;
6: photoelectric conversion unit;
7: electronic signal processing component;
31: beam splitting prism;
32: polarization splitting prism;
33: refractive element;
34: quarter wave plate; and
35: reflecting mirror.

DETAILED DESCRIPTION OF THE EMBODIMENTS

The technical solution of the present invention will be clearly and completely described below in conjunction with the accompanying drawings. Obviously, the embodiments described herein are a part of the embodiments of the present invention rather than all of the embodiments. Based on the embodiments of the present invention, all other embodiments obtained by those skilled in the art without creative work fall within the protection scope of the present invention.

It should be noted that, in the description of the present invention, the orientation or positional relationship indicated by terms such as "center", "on", "below", "left", "right", "vertical", "horizontal", "inner" and "outer" is based on the orientation or positional relationship shown in the drawings, and it is only for the convenience of describing the present invention and simplifying the description, rather than indicating or implying that the indicated device or element must have a specific orientation or be configured and operated in a specific orientation, and therefore they cannot be understood as a limitation to the present invention. In addition, terms such as "first", "second" and "third" are used only for the purpose of description and cannot be understood as indicating or implying relative importance.

It should be noted that, in the description of the present invention, unless otherwise clearly specified and defined, terms such as "installation", "connection" and "coupling" should be understood in a broad sense, for example, they may be a fixed connection, a detachable connection, or an integrated connection; they may be a mechanical connection, or an electrical connection; they may be a direct connection, or may be indirectly connected through an intermediate medium, and they may be an internal communication between two components. For those skilled in the art, the specific meanings of the above terms in the present invention can be understood according to the specific circumstances.

FIG. 1 is a schematic diagram of the two-degree-of-freedom heterodyne grating interferometry measurement system according to the present invention. As illustrated in FIG. 1, the two-degree-of-freedom heterodyne grating interferometry measurement system with a large rotation angle tolerance includes a single-frequency laser device 1, an acousto-optic modulator 2, an interferometer mirror group 3, a measurement grating 4, a receiving optical fiber, a photoelectric conversion unit 6, and an electronic signal processing component 7. Preferably, the receiving optical fiber is a multimode optical fiber 5, and the measurement grating 4 is a one-dimensional reflection type grating.

Figure 2:
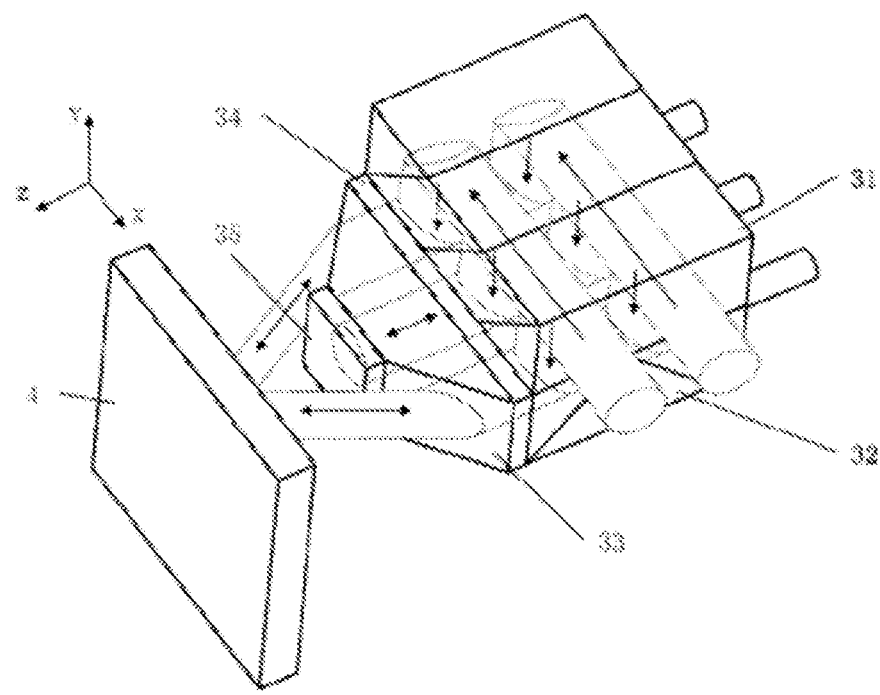
FIG. 2 is a schematic diagram of the structure of the interferometer mirror group according to the present invention.

FIG. 2 is a schematic diagram of the structure of the interferometer mirror group according to the present invention. As illustrated in FIG. 2, the interferometer mirror group 3 includes, from one side to the other side (from left to right, or from a side adjacent to the measurement grating 4 to the other side in FIG. 2), a reflecting mirror 35, a refractive element 33, a quarter wave plate 34, a beam splitting prism 31, and a polarization splitting prism 32 in sequence, wherein the beam splitting prism 31 is positioned on the polarization splitting prism 32, that is, the beam splitting prism 31 is positioned on an upper layer of the interferometer mirror group, and the polarization splitting prism 32 is positioned on a lower layer of the interferometer mirror group, and the refractive element 33 is positioned near the top of one side of the interferometer mirror group (in FIG. 2, near the top on the left), and, in order to achieve an integration with high degree, preferably, the components in the interferometer mirror group 3 are closely adjacent and fixed to each other and are integrated into an integrated structure, and more preferably, the components are fixed to each other in a manner of bonding.

Figure 3:
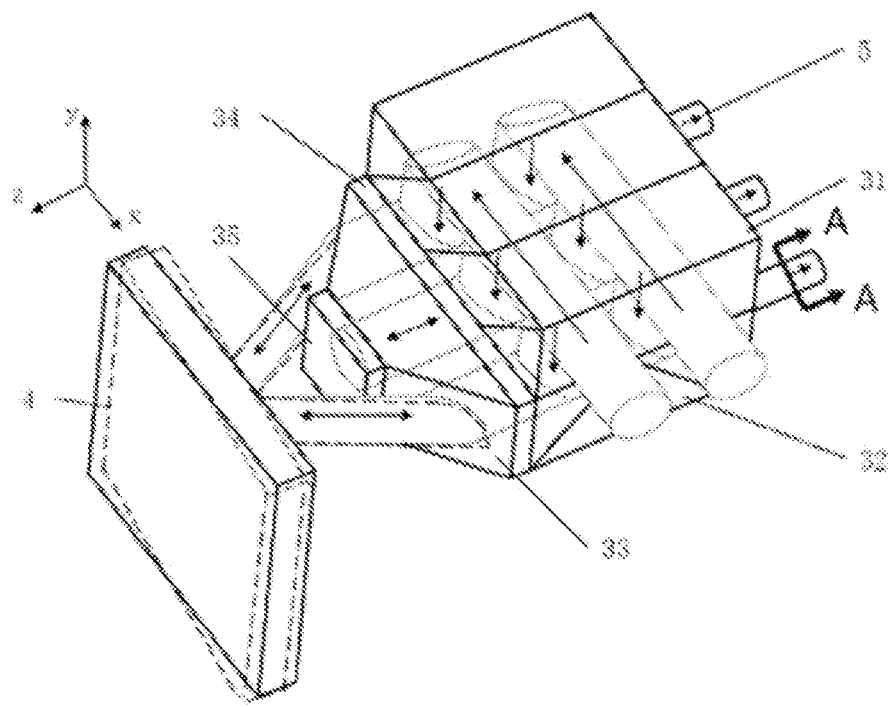
FIG. 3 is a schematic diagram when the grating according to the present invention has a rotation angle error.
Figure 4:
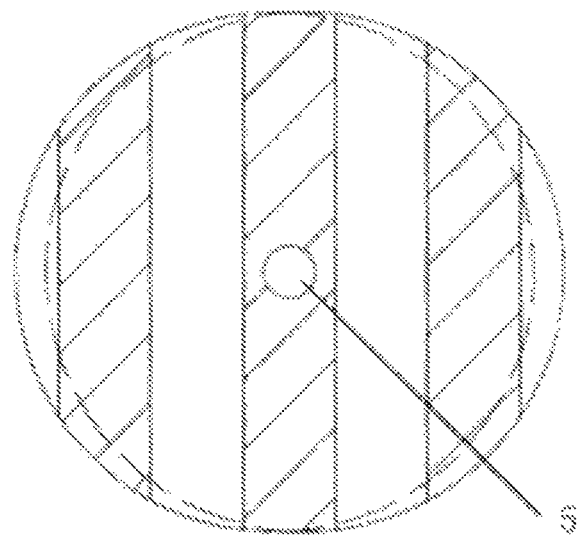
FIG. 4 is a schematic diagram comparing the receiving optical fiber and the interference fringe in the A-A direction in FIG. 3.

FIG. 3 is a schematic diagram when the grating according to the present invention has a rotation angle error. As illustrated in FIG. 3, when the measurement grating has a rotation angle error relative to the ideal measurement position, the measurement light may deviate from the reference light and there may be a certain angle between them, and the two spots of the reference light and the measurement light on the detector may deviate and form an interference fringe, and the multimode optical fiber 5 is utilized to directly receive a part of the interference light signal, and it can be seen from FIG. 4 that a core diameter of the multimode optical fiber 5 is smaller than a width of the interference fringe.

The principle of the grating interferometry measurement system will be specifically explained in detail with reference to FIG. 1 and FIG. 2.

The single-frequency laser device 1 emits a single-frequency light, the single-frequency light is incident to the acousto-optic modulator 2 to be frequency-shifted after being coupled by fiber and being split by a beam splitter, and after collimated by the Green lens, two polarized light i.e., s light with frequency differences are obtained, one of which is used as a reference light and the other of which is used as a measurement light.

The reference light is split twice by the beam splitting prism 31 positioned on the upper layer, to obtain three beams of laser, and the three beams of laser incident downward and are reflected by the polarization splitting prism, and then used as the reference light of three interference signals.

Similarly, the measurement light is split by the beam splitting prism 31 to obtain three beams of laser, and the three beams of laser incident downward, two beams of laser thereof are reflected by the polarization splitting prism 32, then pass through the quarter wave plate 34 and the refractive element 33 in sequence to be deflected, after that, incident to the measurement grating 4, and after being diffracted by the grating, ±1 orders diffraction light includes the information on the rotation angle and the displacement of the grating, the two beams of laser return back along the original optical path, and are transmitted by passing through the quarter wave plate 34 and the polarization splitting prism 32 again, then interfere with the reference light, to form two measurement interference signals; in addition, the another measurement light is reflected by the polarization splitting prism 32, and passes through the quarter wave plate 34 and the reflecting mirror 35 in sequence to be reflected, then returns back along the original optical path, and is transmitted by passing through the quarter wave plate 34 and the polarization splitting prism 32 again, after that interferes with the reference light, to form a reference interference signal.

Preferably, the light path of the present invention adopts an arrangement of Littrow-type, that is, the measurement light passes through the refractive element 33 and then is deflected, and after that the measurement light is incident onto the measurement grating 4 at a specific angle, so that the diffracted light path overlaps with the incident light path, and the diffracted light path passes through the refractive element 33 to form the measurement light parallel to the reference light, and is transmitted by passing through the quarter wave plate 34 and the polarization splitting prism 32 again, then interferes with the reference light, to form two measurement signals.

The two measurement interference signals and the one reference interference signal are respectively directly coupled with partial region of the interference spot via three multimode optical fibers 5, and form a total of three signals, the signal strength of which can meet the requirements for measurement. The three signals are transmitted to the photoelectric conversion unit 6 to be converted into electric signals, and input to the electronic signal processing component 7 to be processed, and the linear motion with two degrees of freedom is calculated by using the obtained phase information. When the measurement grating 4 performs the linear motion with two degrees of freedom in horizontal direction and vertical direction with respect to the interferometer mirror group 3, the electronic signal processing component 7 will output a linear displacement of two degrees of freedom.

The expression of calculation for the two degrees of freedom motion is as follows.

$$x = \frac{\phi_1 - \phi_2}{2} \times \frac{p}{2\pi}$$
$$z = \frac{\phi_1 + \phi_2}{2} \times \frac{\lambda}{4\pi\cos\theta}$$

Wherein, x and z are grating displacements, $\varphi_1$ and $\varphi_2$ are phase variations of the two measurement interference signals relative to the reference interference signal, p is a grating pitch, $\lambda$ is a laser wavelength, $\theta$ is a Littrow angle.

The measurement system and structure configuration given in the above embodiments can realize simultaneous measurement of two linear degrees of freedom, and the system has a short measurement optical path and is rarely affected by the environment, the measurement system uses a multimode optical fiber, so that can effectively reduce the volume and the number of system components, increase the anti-interference ability and system integration of the system, and can effectively avoid the influence on the measurement signal strength due to the installation error of the rotation angle between the interferometer and the measurement grating and the rotation angle deviation during the movement, the measurement signal is easy to be processed, and the measurement resolution of the linear displacement can be of nanometer level. Meanwhile, the grating interferometry measurement system also has the advantages of simple structure, small volume, light weight, facilitating installation and arrangement, convenient application, etc. The two-degree-of-freedom heterodyne grating interferometer displacement measurement system can also be applied to precision measurement of displacement of a workpiece table such as a precision machine tool, a three-coordinate measurement machine, and a semiconductor testing equipment.

Although the foregoing disclosure shows exemplary embodiments of the present invention, it should be noted that, various changes and modifications can be made without departing from the scope defined by the claims. In addition, although the elements of the present invention may be described or required in individual form, it is also conceivable to have a plurality of elements, unless explicitly limited to a single element.

What is claimed is:

1. A two-degree-of-freedom heterodyne grating interferometry measurement system, comprising:
    a single-frequency laser device for emitting a single-frequency laser, the single-frequency laser split into a beam of reference light and a beam of measurement light;
    an interferometer mirror group and a measurement grating for forming a reference interference signal and a measurement interference signal from the beam of reference light and the beam of measurement light,
    a plurality of receiving optical fibers for receiving the reference interference signal and the measurement interference signal, wherein a core diameter of each of the receiving optical fibers is smaller than widths of interference fringes of the reference interference signal and the measurement interference signal, so that the plurality of receiving optical fibers receive parts of the reference interference signal and the measurement interference signal, and wherein the interferometer mirror group, in sequence from one side to an opposing side, comprises: a reflecting mirror, a refractive element, a quarter wave plate, a beam splitting prism, and a polarization splitting prism, wherein the beam splitting prism is positioned on the polarization splitting prism.

2. The grating interferometry measurement system according to claim 1, wherein the plurality of receiving optical fibers are multimode optical fibers, wherein the reference interference signal comprises one path of reference interference signal, the measurement interference signal comprises two paths of measurement interference signals, and wherein the two paths of measurement interference signals and the one path of reference interference signal are coupled to and received by the multimode optical fibers, respectively, to output three optical signals.

3. The grating interferometry measurement system according to claim 2, further comprising:
    a photoelectric conversion unit and an electronic signal processing component, wherein the photoelectric conversion unit receives the optical signals output by the multimode optical fibers, converts the optical signals into electrical signals, and inputs the electrical signals to the electronic signal processing component, and wherein the electronic signal processing component receives the electrical signals to calculate a linear displacement of the measurement grating.

4. The grating interferometry measurement system according to claim 1, wherein the measurement grating performs linear motions with a degree of freedom in a horizontal direction and a degree of freedom in a vertical direction with respect to the interferometer mirror group.

5. The grating interferometry measurement system according to claim 2, wherein the measurement grating performs linear motions with a degree of freedom in a horizontal direction and a degree of freedom in a vertical direction with respect to the interferometer mirror group.

6. The grating interferometry measurement system according to claim 1, wherein the beam of reference light is split into three beams of light after passing through the beam splitting prism, and the three beams of light are used as the reference light of three interference signals after being reflected by the polarization splitting prism, respectively, wherein:
    the beam of measurement light is split into three beams of light after passing through the beam splitting prism, and two beams of the split measurement light are reflected by the polarization splitting prism, then pass through the quarter wave plate and the refractive element in sequence, and then are incident on the measurement grating to be diffracted, and then return back along an original optical path, and then are transmitted by the polarization splitting prism, and then interfere with two beams of the reference light used as the reference light of the three interference signals, to form two measurement interference signals, and
    a third beam of the split measurement light is reflected by the polarization splitting prism, then passes through the quarter wave plate, and then is reflected by the reflecting mirror to return back along an original optical path, and then passes through the quarter wave plate and is transmitted by the polarization splitting prism again, and then interferes with another a third beam of the reference light used as the reference light of the three interference signals, to form one reference interference signal.

7. The grating interferometry measurement system according to claim 6, wherein the two beams of the split measurement light pass through the refractive element, then are incident on the measurement grating in an incident light path of a specific angle, wherein the specific angle causes a diffracted light path to overlap with the incident light path, and wherein the diffracted light path passes through the refractive element to interfere with and in parallel with two beams of the reference light used as the reference light of the three interference signals, to form the two measurement interference signals.

8. The grating interferometry measurement system according to claim 1, wherein components in the interferometer mirror group are adjacent and fixed to each other and are integrated into an integrated structure.

9. The grating interferometry measurement system of claim 1, wherein a cross section of the refractive element is an isosceles trapezoid, and the measurement light is refracted when transmitted through both sides of the trapezoid and is reflected when transmitted through a top of the trapezoid.

10. The grating interferometry measurement system of claim 1, wherein the interferometry measurement system further comprises:
  an acousto-optic modulator for performing frequency shifting of the single-frequency laser.

\* \* \* \* \*